(12) United States Patent  
Grandcolas et al.

(10) Patent No.: US 8,181,232 B2
(45) Date of Patent: May 15, 2012

(54) METHODS AND SYSTEMS FOR SECURE USER AUTHENTICATION

(75) Inventors: Michael Grandcolas, Santa Monica, CA (US); Irina Koryakovtseva, Marlboro, NJ (US); Jennifer Vos, Glen Head, NY (US); Robert A. Herrig, Garrison, NY (US)

(73) Assignee: Citicorp Development Center, Inc., Los Angeles, CA (US)

( * ) Notice: Subject to any disclaimer, the term of this patent is extended or adjusted under 35 U.S.C. 154(b) by 1394 days.

(21) Appl. No.: 11/494,224

(22) Filed: Jul. 27, 2006

(65) Prior Publication Data

US 2007/0050840 A1     Mar. 1, 2007

Related U.S. Application Data

(60) Provisional application No. 60/703,605, filed on Jul. 29, 2005.

(51) Int. Cl.
G06F 7/04 (2006.01)
G06F 15/16 (2006.01)
G06F 17/30 (2006.01)
H04L 29/06 (2006.01)
H04N 7/16 (2011.01)

(52) U.S. Cl. ............................................. 726/5; 726/28
(58) Field of Classification Search ........................ None
See application file for complete search history.

(56) References Cited

U.S. PATENT DOCUMENTS

| 4,599,489 A | 7/1986 | Cargile | 178/22.08 |
| 4,609,777 A | 9/1986 | Cargile | 178/22.08 |
| 4,800,590 A | 1/1989 | Vaughan | 380/25 |
| 4,819,267 A | 4/1989 | Cargile et al. | 380/23 |
| 5,280,527 A | 1/1994 | Gullman et al. | 380/23 |
| 5,481,611 A | 1/1996 | Owens et al. | 380/25 |
| 5,657,388 A | 8/1997 | Weiss | 380/23 |
| 5,737,421 A | 4/1998 | Audebert | 380/23 |
| 5,802,176 A | 9/1998 | Audebert | 380/23 |
| 5,887,065 A | 3/1999 | Audebert | 380/23 |
| 5,937,068 A | 8/1999 | Audebert | 380/23 |

(Continued)

OTHER PUBLICATIONS

Extended European Search Report, European Patent Office, Sep. 30, 2011, 1-6.

*Primary Examiner* — Nasser Goodarzi
*Assistant Examiner* — Trong Nguyen
(74) *Attorney, Agent, or Firm* — Johnson, Marcou & Isaacs, LLC; John M. Harrington

(57) ABSTRACT

A computer-implemented method and system for secure user authentication in electronic commerce involves maintaining electronic information having a first aspect that is accessible over a first electronic communication channel in response to entry of a first credential known to the user and a second aspect that is accessible by the user over the first electronic communication channel in response to entry of a second credential provided to the user at a pre-registered delivery address on a second electronic communication channel. The second credential is provided to the user via the second electronic communication channel in response to entry of a predetermined user selection during a current session of user access to the first aspect if no change has occurred in the pre-registered delivery address within a pre-determined period of time, and the user is allowed a session of access to the second aspect in response to entry of the second credential either during the current session of user access to the first aspect or during a succeeding session of user access to the first aspect.

11 Claims, 17 Drawing Sheets

U.S. PATENT DOCUMENTS

| | | | |
|---|---|---|---|
| 6,044,154 A | 3/2000 | Kelly | 380/25 |
| 6,067,621 A | 5/2000 | Yu et al. | 713/172 |
| 6,078,908 A | 6/2000 | Schmitz | |
| 6,173,400 B1 | 1/2001 | Perlman et al. | 713/172 |
| 6,266,413 B1 | 7/2001 | Shefi | 380/46 |
| 6,317,838 B1 | 11/2001 | Baize | 713/201 |
| 6,327,662 B1 | 12/2001 | Araujo | 713/200 |
| 6,338,140 B1 | 1/2002 | Owens et al. | 713/168 |
| 6,343,361 B1 | 1/2002 | Nendell et al. | 713/171 |
| 6,445,794 B1 | 9/2002 | Shefi | 380/46 |
| 6,480,958 B1 | 11/2002 | Harrington | 713/184 |
| 6,694,436 B1 | 2/2004 | Audebert | 713/200 |
| 6,731,731 B1 | 5/2004 | Ueshima | 379/196 |
| 6,732,278 B2 | 5/2004 | Baird, III et al. | 713/201 |
| 6,829,356 B1 | 12/2004 | Ford | 380/44 |
| 6,880,079 B2 | 4/2005 | Kefford et al. | 713/155 |
| 6,904,526 B1 | 6/2005 | Hongwei | 713/182 |
| 6,908,030 B2 | 6/2005 | Rajasekaran et al. | 235/379 |
| 6,928,558 B1 | 8/2005 | Allahwerdi et al. | 713/202 |
| 2001/0054148 A1 | 12/2001 | Hoornaert et al. | 713/172 |
| 2001/0055388 A1 | 12/2001 | Kaliski, Jr. | 380/30 |
| 2002/0002678 A1 | 1/2002 | Chow et al. | 713/169 |
| 2002/0087860 A1 | 7/2002 | Kravitz | 713/168 |
| 2002/0103765 A1 | 8/2002 | Ohmori | 705/67 |
| 2002/0112156 A1 | 8/2002 | Gien et al. | 713/156 |
| 2002/0147930 A1 | 10/2002 | Pritchard et al. | 713/202 |
| 2002/0159601 A1 | 10/2002 | Bushmitch et al. | 380/277 |
| 2002/0166048 A1 | 11/2002 | Coulier | 713/169 |
| 2003/0037262 A1 | 2/2003 | Hillhouse | 713/202 |
| 2003/0084304 A1 | 5/2003 | Hon et al. | 713/185 |
| 2003/0112972 A1 | 6/2003 | Hattick et al. | 380/46 |
| 2003/0115154 A1 | 6/2003 | Anderson et al. | 705/73 |
| 2003/0152254 A1 | 8/2003 | Ha et al. | 382/124 |
| 2003/0159068 A1* | 8/2003 | Halpin et al. | 713/201 |
| 2003/0163739 A1 | 8/2003 | Armington et al. | 713/202 |
| 2003/0191949 A1 | 10/2003 | Odagawa | 713/186 |
| 2003/0208697 A1 | 11/2003 | Gardner | 713/202 |
| 2003/0212894 A1 | 11/2003 | Buck et al. | 713/184 |
| 2004/0049685 A1 | 3/2004 | Jaloveczki | 713/182 |
| 2004/0054932 A1 | 3/2004 | Vaneklase | |
| 2004/0059952 A1 | 3/2004 | Newport et al. | 713/202 |
| 2004/0088576 A1* | 5/2004 | Foster et al. | 713/201 |
| 2004/0097217 A1 | 5/2004 | McClain | 455/411 |
| 2004/0103290 A1 | 5/2004 | Mankins | 713/193 |
| 2004/0111520 A1 | 6/2004 | Krantz et al. | 709/229 |
| 2004/0139028 A1 | 7/2004 | Fishman et al. | 705/67 |
| 2004/0153668 A1 | 8/2004 | Baier Saip et al. | 713/201 |
| 2004/0172531 A1 | 9/2004 | Little et al. | 713/155 |
| 2004/0230807 A1 | 11/2004 | Baird, III et al. | 713/182 |
| 2004/0243856 A1 | 12/2004 | Shatford | 713/202 |
| 2004/0249503 A1* | 12/2004 | Sanchez | 700/237 |
| 2004/0255119 A1 | 12/2004 | Ukeda et al. | 713/169 |
| 2005/0015588 A1 | 1/2005 | Lin et al. | 713/159 |
| 2005/0050330 A1 | 3/2005 | Agam et al. | 713/172 |
| 2005/0069137 A1 | 3/2005 | Landrock | 380/278 |
| 2005/0149762 A1 | 7/2005 | Smith et al. | 713/202 |
| 2005/0154923 A1 | 7/2005 | Lok et al. | 713/202 |
| 2005/0166263 A1 | 7/2005 | Nanopoulos et al. | 726/7 |
| 2005/0187873 A1 | 8/2005 | Labrou et al. | 705/40 |
| 2005/0188202 A1 | 8/2005 | Popp | 713/175 |
| 2005/0191992 A1 | 9/2005 | Inoue et al. | 455/411 |
| 2005/0193198 A1 | 9/2005 | Livowsky | 713/168 |
| 2005/0208891 A1 | 9/2005 | Khare et al. | 455/39 |
| 2005/0210252 A1 | 9/2005 | Freeman et al. | 713/171 |

* cited by examiner

SUBJECT: Citibank Authorization Code

Hello JOHN,

You have requested an Authorization Code to use a special online feature at Citibank.com.

To use the code, just:

Make sure you're signed on

Select the desired feature

Enter this code:

1304550425

(You can also COPY + PASTE the code to avoid typing it.)

The code is valid through MM/DD/YYYY. After that, you will need to request a new one.

ABOUT THIS MESSAGE
Please do not reply to this customer server email. For account-specific inquiries, kindly call 1-800-374-9700 or visit [www.citibankonline.com/222.myciti.com]

SUBJECT: Email Address Change

As you requested, we have changed your email address:

OLD ADDRESS:
[johndoe@aol.com]

NEW ADDRESS:
'borisbadenov@dastardlyhacker.com]

If you did not request this change, please call
1-800-374-9700 immediately.

For your security, this message is being sent to both your old and new email addresses

ABOUT THIS MESSAGE

Please do not reply to this customer service email. For account-specific inquiries, kindly call or visit
[www.citibankonline.com/www.myciti.com].

METHODS AND SYSTEMS FOR SECURE USER AUTHENTICATION

PRIORITY APPLICATION

This application claims the benefit of U.S. Provisional Application No. 60/703,605 filed Jul. 29, 2005, entitled "Methods and Systems for Secure User Authentication" and incorporated herein by this reference.

FIELD OF THE INVENTION

The present invention relates generally to the field of electronic commerce, and more particularly to methods and systems for secure user authentication in electronic commerce transactions.

BACKGROUND OF THE INVENTION

Currently, credential theft is a substantial danger in the online world, for example, through "phishing", key loggers, spyware, and man-in-the middle attacks, among others. There is presently a push from both regulators and financial institutions, such as banks, to come up with two-factor authentication techniques by which the threat of a simple credential theft, such as theft of a password, is mitigated, for example, by the fact that there is some factor other than a simple password involved in authentication. A number of forms of two-factor identification have been proposed which utilize something else besides a standard password, such as a user's fingerprint, or in a physical world, a user's ATM card.

Another example of the use of something else besides a standard password is what are referred to as one-time passwords, and specifically one-time password tokens or key fobs. These one-time password tokens represent a type of standard but very expensive way to provide a customer with a device that continuously generates a time-based, or event based, one-time password. Thus, when a user prepares to log in, the user consults the device, and the device displays, for example, a number that the user keys in and which can be used only once. Thus, if an unauthorized person intercepts the particular number, it is too late for the unauthorized person to use it.

However, those types of solutions are extremely expensive and are not necessarily user friendly. For example, customers are typically required to carry their tokens around with them, and if a customer has relationships, for example, with three or four banks, the customer is required to carry around three or four different tokens. In addition, the tokens have a limited useful life after which they must be replaced. Further, the task of distributing the tokens to users creates issues of security and expense for financial institutions, and security and convenience issues are likewise created on the customer's side in keeping up with their multiple tokens.

A particularly troublesome aspect of credential theft is electronic fraud in which increasing numbers of unsuspecting customers of financial institutions, such as banks, are phished by being sent emails attempting to trick them into revealing their user names and passwords or PINs to an unauthorized party. Typically, an unauthorized party who succeeds in capturing the log-in credentials of a bank customer through email phishing or perhaps via software viruses, reuses the customer's credentials to log on to the bank's online banking website to perform fraudulent transactions. One such type of fraudulent transaction involves use of the customer's stolen log-in credentials to move money internationally by wire transfer, and another type of fraud is a transaction referred to as a global intercity transaction that involves moving money, for example, from a bank account in the United States to a foreign bank account and withdrawing the money.

SUMMARY OF THE INVENTION

It is a feature and advantage of the present invention to provide a next-time password solution for secure user authentication in electronic commerce transactions that does not require any special phone resident software.

It is a further feature and advantage of the present invention to enable secure user authentication in electronic commerce transactions utilizing a next-time password that is unique to the customer, that can be used only once, and that has an extremely low chance of being intercepted.

It is a another feature and advantage of the present invention to provide secure user authentication in electronic commerce transactions employing a next-time password solution for which a financial institution typically has most of the infrastructure to implement already in place.

It is an additional feature and advantage of the present invention to provide a secure transaction code solution for secure user authentication in electronic commerce that provides protection for a financial institution's customers from fraudulent transactions even if their primary log-in credentials are stolen.

It is a still further feature and advantage of the present invention to provide secure user authentication in electronic commerce transactions utilizing a secure transaction code solution in which there is no requirement for the customer to have any kind of physical device that generates a unique one-time value.

It is still another feature and advantage of the present invention to provide secure user authentication in electronic commerce transactions employing the secure transaction code solution to achieve secure aspects of a one-time password without the expense, inconvenience, and complications of using one-time password key fobs or similar types of one-time password generating devices.

To achieve the stated and other features, advantages and objects, embodiments of the present invention make use of computer hardware and software to provide methods and systems for secure user authentication in electronic commerce transactions utilizing a next-time password solution in which each time a user, such as a financial institution customer, logs off of the financial institution's site, a next-time password is sent to the customer, for example, at the customer's pre-registered cell phone or email address by the financial institution, for example, via text message. The one-time value that is the next-time password is sent to the customer out of band of the Internet channel to either the customer's email address or cell phone. When the customer returns to the financial institution's site, the customer can enter the customer's normal login credentials, such as the customer's username and password. In addition, the customer can consult, for example, the customer's cell phone or email address and find the next-time password which was stored in the customer's cell phone under saved messages or in the email folder of the customer's computing device. If for some reason the customer does not have a next-time password or is unable to find the next-time password stored in the customer's phone, it is only necessary for the customer to enter his or her username and password to be allowed into the financial institution's site. In both cases, the customer must have previously registered a delivery address for the next-time password, such as an email address or a cell phone number as the delivery vehicle for the customer's secure transaction code.

Alternative embodiments of the invention provide methods and systems for secure user authentication in electronic commerce transactions utilizing a secure transaction code in which the procedure of a customer using the customer's log-in credentials to log on to the bank's system remains unchanged. However, if the customer attempts to perform certain pre-defined types of transactions deemed by the bank to be sensitive functions, the customer must answer a one-time value, i.e., the secure transaction code, in order to execute the sensitive transaction. The one-time value that is the secure transaction code is sent to the customer out of band of the Internet channel to the customer's pre-registered delivery address, such as the customer's email address or cell phone. As in the next, the customer must have previously registered a delivery destination for the secure transaction code, such as an email address or a cell phone number as the delivery vehicle for the customer's secure transaction code. Upon receipt by the customer of the secure transaction code at the customer's email address or cell phone, the customer views the value and answers it on the website and is then allowed to proceed and execute the transaction deemed by the bank to be a sensitive function.

Embodiments of the invention provide computer-implemented methods and systems for secure user authentication in electronic commerce that involve, for example, maintaining electronic information having a first aspect, such as pre-selected non-sensitive transaction aspects of the electronic information, and a second aspect, such as pre-selected sensitive transaction aspects of the electronic information. The first aspect of the electronic information is accessible by a user over a first electronic communication channel in response to entry of a first credential known to the user, and the second aspect is accessible by the user over the first electronic communication channel only in response to entry of a second credential provided to the user.

In embodiments of the invention the first electronic communication channel includes, for example, a computing device, such as a PC, laptop, or PDA device, coupled over a global network to a website server. In further embodiments, the first electronic communication channel includes, for example, the computing device coupled over the global network to a transaction server via the website server. In alternative embodiments, the first electronic communication channel includes, for example, a self-service financial transaction terminal coupled over a self-service financial transaction terminal network to a host server.

The first credential for embodiments of the invention is a designation, such as a username and/or a password selected by the user for identifying the user, and the second credential is a randomly generated secret code for identifying the user that is provided to the user. The second credential can be provided to the user for a single session of access to the second aspect of the electronic information and/or the second credential can have a pre-determined expiry after which the second identifying credential is no longer valid for accessing the second aspect of the electronic information.

Embodiments of the invention further involve pre-registering a delivery address on a second electronic communication channel that is different from the first electronic communication channel (i.e., out of band to the first channel), such as a mobile telecommunication device address or an email address, for providing the second credential to the user. According to embodiments of the invention a user is allowed a current session of access to the first aspect in response to entry of the first credential, and the second credential is provided to the user at the pre-registered delivery address via the second electronic communication channel, such as by text message, in response to entry of a pre-determined user selection during the session of user access to the first aspect if no change has occurred in the pre-registered delivery address within a pre-determined period of time.

According to embodiments of the invention, the second identifying credential can be provided to the user in response to a user log-off of at a conclusion of the current session of user access to the first aspect for use during a succeeding session of user access to the first aspect. In alternative embodiments, the second credential can be provided to the user in response to a user request for the second credential during the current session of user access to the first aspect. In further alternative embodiments, the second identifying credential can be provided to the user in response to a user attempt to access the second aspect of the electronic information (i.e., pre-selected sensitive transaction aspects of the electronic information), during the current session of user access to the first aspect, for example, in response to receiving an indication of the user's attempt to navigate to the pre-selected sensitive transaction aspects of the electronic information.

In any event, according to embodiments of the invention, the user is allowed a session of access to the second aspect of the electronic information via the first electronic communication channel in response to entry of the second credential either during the current session of user access to the first aspect or during a succeeding session of user access to the first aspect.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 9 is a sample payments and transfers GUI menu screen for the secure transaction code aspect of embodiments of the invention;

FIG. 14 is a sample authorization code email message for the secure transaction code aspect of embodiments of the invention;

FIG. 15 is a sample change email notification message for the secure transaction code aspect of embodiments of the invention;

FIG. 16 is a sample home page displaying the customer's current email address for the secure transaction code aspect of embodiments of the invention.

DETAILED DESCRIPTION

Figure 1:
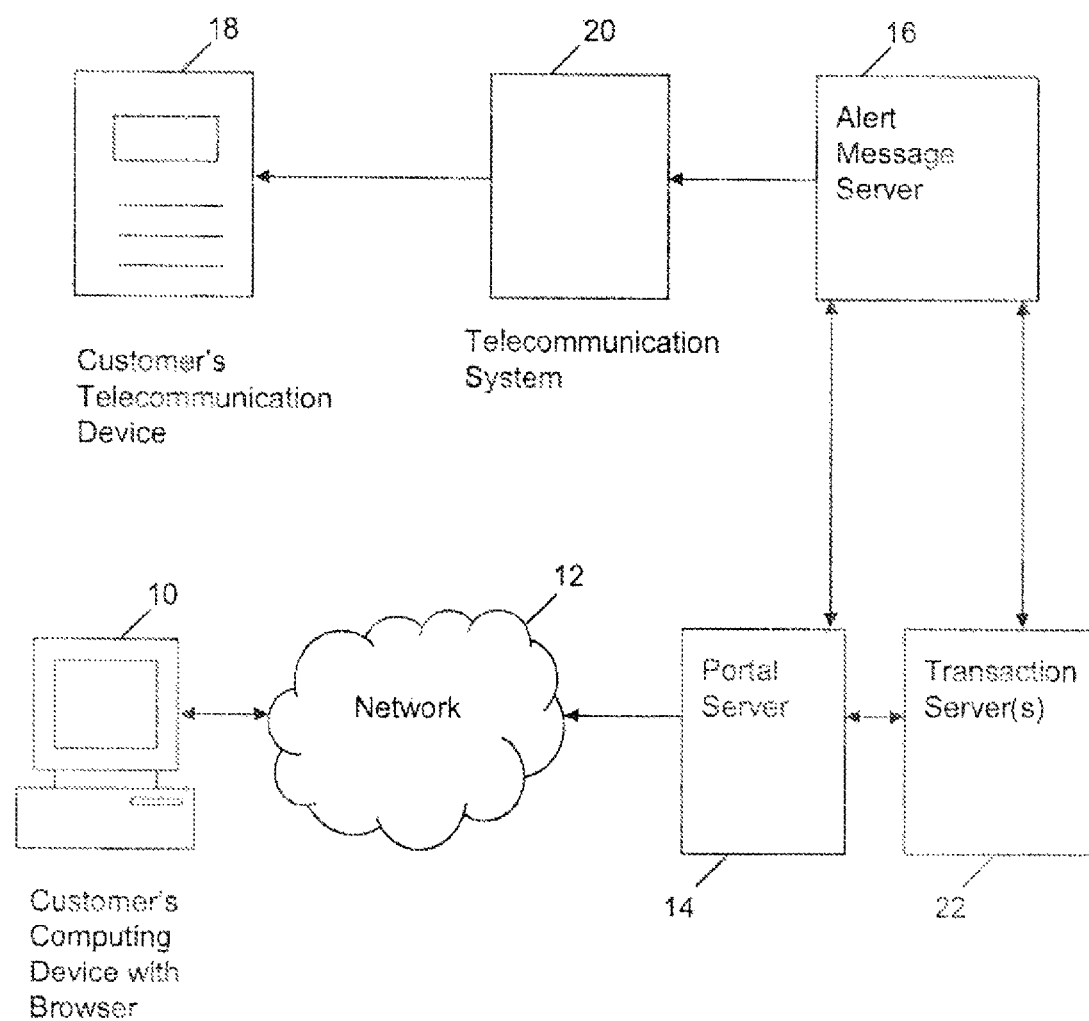
FIG. 1 is a schematic diagram that illustrates an example of key components and the flow of information between key components of a secure user authentication system for embodiments of the invention.

Reference will now be made in detail to embodiments of the invention, one or more examples of which are illustrated in the accompanying drawings. Each example is provided by way of explanation of the invention and not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

A next-time password aspect of embodiments of the present invention proposes a different form of one-time passwords that leverages existing technology. A key to a one-time password embodiment is that it is given to a user on some channel that is outside the manner in which the user accesses, for example, the user's Internet service. As previously noted, current one-time password solutions require the user to carry a separate device which generates a time-based, one-time password. These devices are expensive and inconvenient, and they take up space, for example, on a key chain. However, almost everyone has a cell phone or email address, and cell phone usage is growing. In an embodiment of the invention, every time a user, such as a financial institution customer, logs off of the financial institution's site, a next-time-password is sent to the customer's pre-registered delivery address, such as the customer's cell phone or email address or other out-of-band channel, by the financial institution, for example, via text message.

The next-time password for an embodiment of the invention is good for one-time use and optionally can also have an expiry time and/or date associated with it, after which the next-time password is no longer valid. It is to be understood that while the present example refers to sending the next-time password to a cell phone, a mobile phone or an email address, the channel for delivery of the next-time password can be any other suitable communication channel, such as some type of e-mail account or even a voice mail to the customer's home phone, that is out of band or different from the communication channel by which the customer communicates with the institution's site. Thereafter, when the customer returns to the financial institution's site, the customer can enter the customer's normal login credentials, such as the customer's username and password. In addition, the customer can consult, for example, the customer's cell phone and find the next-time password which was stored in the customer's cell phone under saved messages.

In the next-time password aspect of embodiments of the invention, if for some reason the customer does not have a next-time password or is unable to find the next-time password stored in the customer's mobile phone, it is only necessary for the customer to enter his or her username and password to be allowed into the financial institution's site. At the same time the customer comes into the site, a next-time password is immediately sent to the customer's registered cell phone or other delivery device. Then, upon receiving the next-time password in real time or pseudo-real time, the customer can enter the next-time password and be allowed full access into the entire site.

The next-time password solution for embodiments of the invention does not require any phone resident software to generate a next-time password token. While it can be argued that a constantly changing token value may be slightly safer than the next-time password, since the next-time password is unique to the customer and can be used only once, the realistic chance of the next-time password being intercepted is extremely low, and it provides a very effective one-time password. Moreover, a financial institution may typically have most of the infrastructure in place to implement the next-time password for embodiments of the invention.

For an example of use of the next-time password for embodiments of the invention, a customer at a computing device with a browser logs onto a financial institution's online banking website by entering his or her username and password. In addition, the customer locates his or her next-time password among saved messages on the customer's mobile phone and enters the next-time password. The next-time password is valid for only one use and as soon as the customer enters the next-time password, it is no longer valid for any purpose. Thereafter, when the customer logs off, another next-time password is sent to the customer's registered communication device, such as the customer's mobile phone. Thus, even if an unauthorized party intercepts the customer's next-time password, any interception will most likely occur after the next-time password has already been used. In other words, if the next-time password is intercepted via a key logger, is it too late, because the next-time password was already used when the customer entered the financial institution's site and is no longer valid for any purpose.

Accordingly, the next-time password for embodiments of the invention has all the characteristics of a one-time password except that instead of constantly being generated, for example, every few seconds, the next-time password is sent to the customer when he or she logs out of a site for use when the customer returns to the site at a later time. Further, if the customer is unable to find his or her next-time password when he or she wants to return to the financial institution's site, the customer simply enters his or her username and password and then, for example, clicks on a button to say that he or she does not have his or her next-time password. In response, the financial institution immediately sends a next-time password to the customer's registered device, which the customer can then enter for full access to the site, for example, for online banking.

FIG. 1 is a schematic diagram that illustrates an example of key components and the flow of information between key components of a secure user authentication system for embodiments of the invention. Referring to FIG. 1, the system for embodiments of the invention includes, for example, a customer's computing device 10, such as the customer's PC, laptop, or PDA, is coupled over a network 12, such as the Internet or other global network, to a portal server 14 by which a user, such as a customer, accesses a web site. The portal server 12 can be the portal server of any entity, including for example, a financial institution, such as a bank. In addition, an alert Message server 16 provides, for example, email messages to the customer at the customer's computing device 10 via the network 12 or the message server 16 can provide, for example, text messages to the customer's telecommunication device 18, such as a mobile or land phone, via a telecommunication system 20. Further, the portal server 14 may also provide access to one or more transaction servers 22, which can include a federation of such servers.

Figure 2:
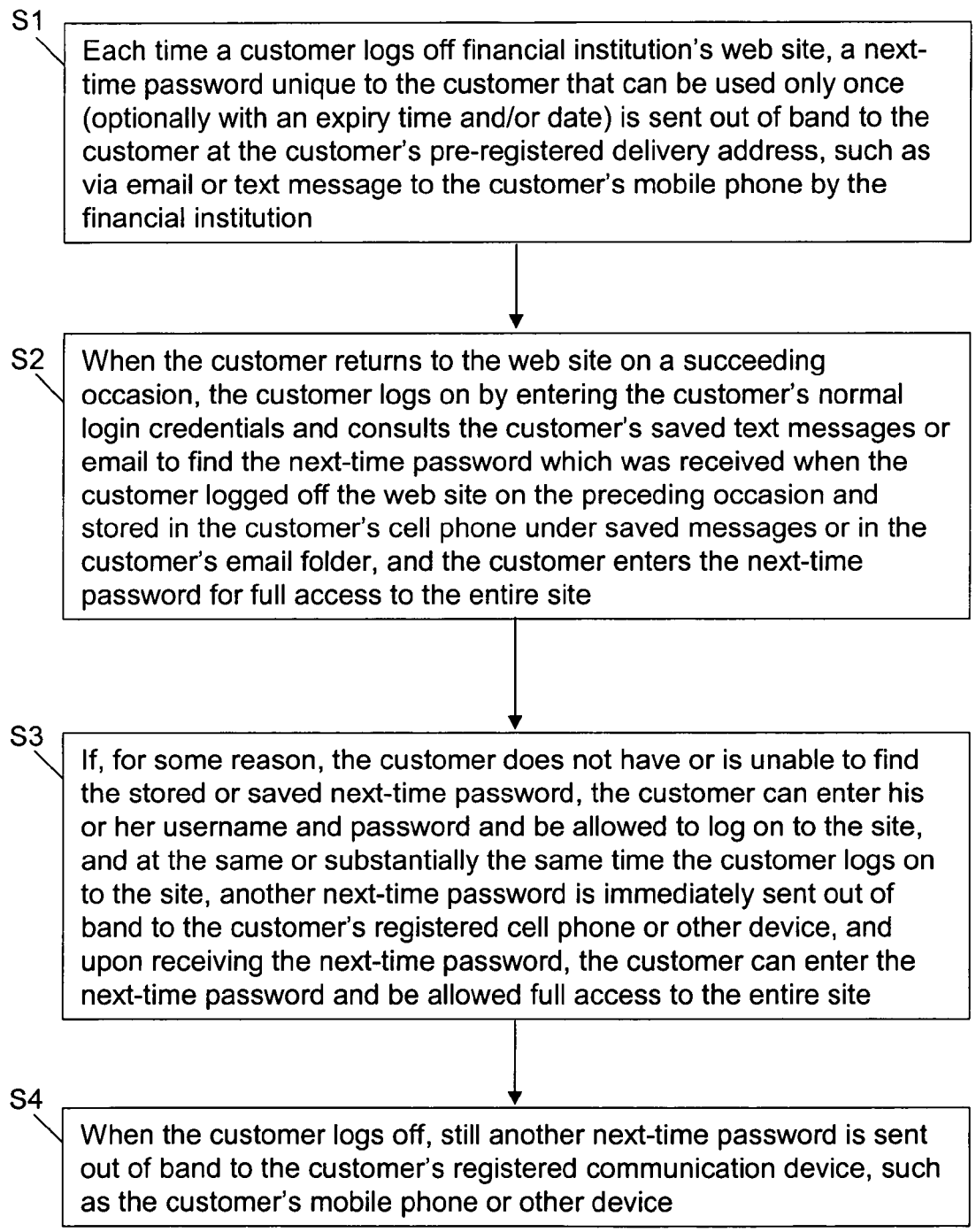
FIG. 2 is a flow chart that illustrates an example of a next-time password aspect process for embodiments of the invention.

FIG. 2 is a flow chart that illustrates an example of a next-time password aspect process for embodiments of the invention. Referring to FIG. 2, at S1, each time the customer logs off, for example, the financial institution's web site 14, a next-time password unique to the customer that can be used only once (and optionally can have an expiry time and/or date) is sent to the customer via an out-of-band communication channel, such as to the customer's pre-registered email address or cell phone 18 by the financial institution, for example, via text message. At S2, when the customer returns to the web site 14 on a succeeding occasion, the customer logs on by entering the customer's normal login credentials, such as the customer's username and password, and in addition, the customer consults, for example, the stored messages on the customer's cell phone 18 or email on the customer's computing device 10 to find the next-time password which was received when the customer logged off the web site 14 on the preceding occasion and stored in the customer's cell phone under saved messages or in the customer's email folder, and the customer enters the next-time password for full access to the entire site.

Referring again to FIG. 2, at S3, if for some reason the customer does not have or is unable to find the stored or saved next-time password, the customer can enter his or her username and password and is allowed to log on to the financial institution's site 14, and at the same or substantially the same time that the customer logs onto the site, a next-time password is immediately sent out-of-band to the customer's registered cell phone 18 or other device, and upon receiving the next-time password, the customer can enter the next-time password and be allowed full access into the entire site. Thereafter, at S4, when the customer logs off, another next-time password is sent out-of-band to the customer's registered communication device, such as the customer's mobile phone 18.

While the foregoing example refers to accessing an online financial institution or banking web site, use of the next-time password for embodiments of the invention is in no way limited to the site of a bank or other type of financial institution. Nor is use of the next-time password limited to accessing a web site. For example, the next-time password can also be employed in an automatic teller machine (ATM) system, as well as in any other operation in which a customer is required to enter authentication information. In addition, while as previously mentioned, the next-time password solution for embodiments of the invention does not require phone-resident software to generate the next-time password, alternative embodiments of the invention involve, for example, providing the customer a simple phone-resident application that makes it easier and more convenient for the customer to save and view the next-time password token that was sent to his or her cell phone 18. Another alternative aspect for embodiments of the invention involves, for example, a phone-resident application that generates the next-time password token.

A key feature of the next-time password aspect for embodiments of the invention is that every time a customer logs off the financial institution's site 14, a next-time password is sent to the customer's registered device, such as the customer's cell phone 18, and the next time the customer logs on, in addition to entering his or her username and password, the customer simply consults messages store on his or her mobile phone 18, which is typically in the customer's immediate possession, and finds and enters the previously provided next-time password. Thus, the customer is not required to carry anything that he or she does not typically carry anyway.

It is to be understood that while the next-time password solution for embodiments of the invention can be implemented by any number of different types of entities, including without limitation, financial institutions, such as banks, as well as other types of financial institutions, the usefulness of the next-time password is not limited to financial institutions, and it can be implemented for logging into other types of sites as well. The next-time password aspect of embodiments of the invention combines elements to provide a one-time password in the form of the next-time password that, while it does not constantly change, changes often enough and is delivered in a way that is secure enough that the chances of interception and theft, especially mass theft, are extremely low. Further, the implementation and use of the next-time password solution for embodiments of the invention is extremely economical and does not require the purchase and distribution of expensive token devices. Nor is it dependent on different versions of phones and will work with virtually any phone that supports, for example, text messaging.

The secure transaction code aspect for embodiments of the invention provides an approach to protect a bank's customers from fraudulent transactions even if their primary log-in credentials are stolen. In the secure transaction code aspect, the procedure in which a customer uses the customer's log-in credentials to log on to the bank's system remains unchanged, but if the customer attempts to perform certain pre-defined types of transactions deemed by the bank to be sensitive functions, such as wire transfers or global intercity transfers, the customer must answer a one-time value, i.e., the secure transaction code, in order to execute the sensitive transaction. In the secure transaction code aspect, the one-time value that is the secure transaction code is likewise sent to the customer out of band of the Internet channel to the customer's pre-registered delivery address, such as the customer's email address or cell phone 18. As in the next-time password aspect, the customer must have previously registered a delivery destination address, as an email address or a cell phone number as the delivery vehicle for the customer's secure transaction code. Upon receipt by the customer of the secure transaction code at the customer's email address or cell phone 18, the customer views the value and answers it on the website 12 and is then allowed to proceed and execute the transaction deemed by the bank to be a sensitive function.

A feature of the secure transaction code aspect for embodiments of the invention relates to a further manner of protecting access inside the bank's website. Because there are potentially a multitude of different kinds of functions that can be protected by the secure transaction code, an embodiment of the invention deploys the main gating protection in the navigation of the site itself. Thus, when a customer tries to click on a function or a navigation link that would take the customer to a sensitive function, the customer is requested to enter a secure transaction code. If the customer who is asked to enter a secure transaction code does not have one, the customer can respond via the GUI of the website 12 that he or she does not have a secure transaction code. Thereupon, the navigational aspect of the site 12 working with a security component of the site 12 generates a secure transaction code and causes it to be delivered, for example, to the customer's email address or cell phone 18. Upon receipt of the secure transaction code, even within the same session, the customer can enter the value representing the secure transaction code and is allowed to proceed.

A further feature of the secure transaction code aspect of embodiments of the invention relates to providing protection for functions that are both on the bank's primary site 14 itself and on any of a number of federated sites that are also part of the bank's online banking functionality, including for example, sites for a functionality that is the executor for global intercity transfers and a functionality that is the executing system for wire transfers. Providing this protection involves, for example, tasking an indicator for a single sign-on mechanism of the bank to the federated sites 22 telling the federated sites 22 that the customer has requested a secure function and advising the federated sites 22 whether or not the customer has entered a secure transaction code.

The secure transaction code aspect for embodiments of the invention is viewed as a form of a one-time password, meaning that it can be entered only once, and once it has been entered, it can never be used again. Thus, if the secure transaction code is stolen, it has no value. The secure transaction code can also have a time period for which it remains valid, which can any suitable length of time, such as a few minutes up to several days. Thus, when a secure transaction code is issued, the customer is notified that it is valid for only the pre-determined amount of time, after which it expires. However, the customer is also made aware that he or she can receive a new secure transaction code in advance of the next occasion on which he or she may want to perform one of the sensitive functions, and the secure transaction code can also be used for performing multiple sensitive transactions within a single customer session once the customer enters the secure transaction code.

Referring to FIG. 1, in an example of the secure transaction code aspect for embodiments of the invention, when the customer selects a link on a financial institution portal 14 to a sensitive transaction, an authorization page is displayed that explains the need for an authorization code to access the particular function. For example, when the customer clicks on a link for a function deemed by the financial institution to be a sensitive transaction, such as wire transfer, within a menu page, the link brings up the authorization page. If the financial institution portal 14 detects that the customer does not have an email address on the customer's stored profile, a modified version of the authorization page is brought up. The portal 14 confirms whether or not the customer is entitled to the wire transfer functionality and if so, the portal 14 retrieves the customer's pre-registered email address and the date when it was last modified on the customer's stored profile record. The portal 14 causes a random secret code (i.e., secure transaction code) to be issued for the customer and stored on the customer's profile record, as well as the secret code issue date. In addition, the portal 14 causes an email to be sent out-of-band to the customer with the secret code. Upon entry of the secret code by the customer on the authorization page, the secret code entered by the customer is compared by the portal 14 with the stored secret code and its expiration date.

In embodiments of the secure transaction code aspect of the invention, alerts are sent to customers whenever the email address on the customer's profile is changed. For example, the portal 14 can send one or more messages to the customer via postal service about the changed email address. In addition, the current customer profile e-mail address can be displayed on the customer's signed-on home page, along with a link to edit the address. Further, whenever an email address change is made, a notification that the address has been changed can be displayed on the customer's signed-on home page. If the customer enters the secret code after it has expired, a message is displayed advising the customer to request a new secret code and the customer is routed to a new code request screen. If the code is entered correctly and has not expired, the customer is routed to the appropriate screen for the requested sensitive transaction. If the code entered is incorrect, an error screen is displayed and an attempt counter is increased.

Figure 3:
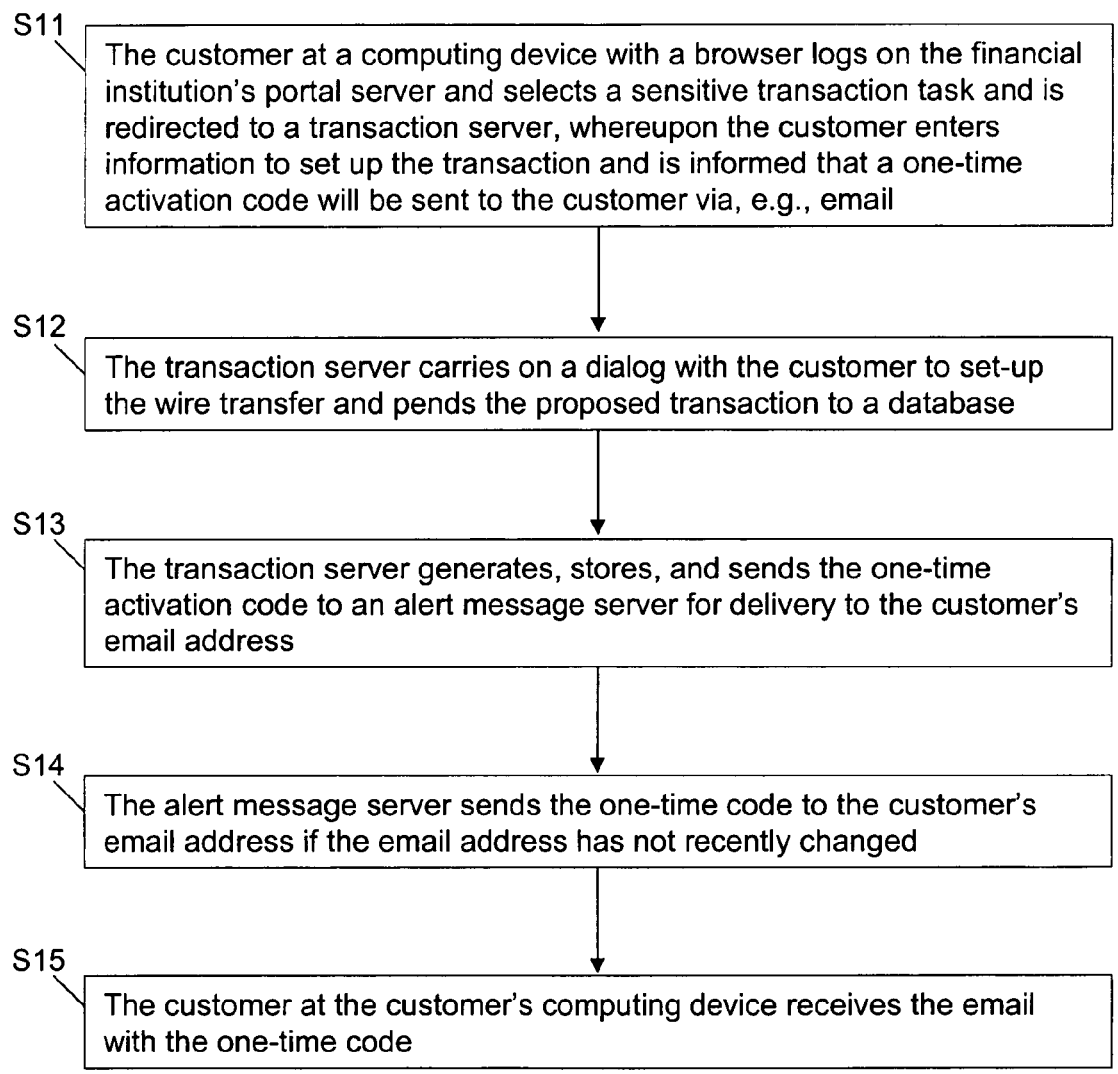
FIG. 3 is a flow chart that illustrates an example of the pending stage of a transaction provider enforced one-time authentication code aspect process for embodiments of the invention.

Embodiments of the secure transaction code aspect provide, for example, a transaction provider-enforced one-time authentication code process with a pending stage and an activation stage; a navigation provider-enforced authentication code process with a request access code stage and an access allowed stage; and/or a hybrid navigation provider-enforced/transaction provider-enforced-plus-aware menus authentication code process, likewise with a request access code stage and an access allowed stage. FIG. 3 is a flow chart that illustrates an example of the pending stage of the transaction provider-enforced one-time authentication code aspect process for embodiments of the invention. In the transaction provider enforced process, the transaction provider is responsible for the additional authentication enforcement and supports the pending or setup stage, as well as the activate of execute stage.

Referring to FIG. 3, at S11, the customer at a computing device 10 with a browser logs on, for example, the financial institution's home banking portal server 14 and selects a sensitive transaction task, such as a wire transfer, is redirected to a financial institution transaction server 22, enters information to set up the transaction, and is informed that a one-time activation code (i.e., secure transaction code) will be emailed to the customer. Referring further to FIG. 3, at S12, the transaction server 22 carries on a dialog with the customer to set-up the wire transfer and pends the transaction to a database. At S13, the transaction server 22 generates, stores, and sends the one-time activation code to a financial institution alert message server 16 for delivery to the customer's email address. At S14, the alert message server 16 sends the one-time code to the customer's email address if the email address has not recently changed. At S15, the customer at the customer's computing device 10 receives the email with the one-time code.

Figure 4:
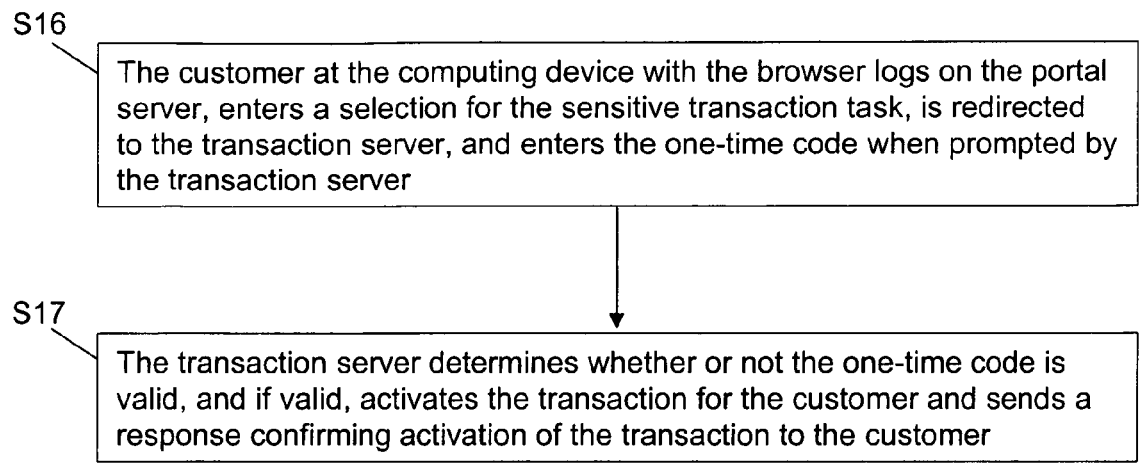
FIG. 4 is a flow chart that illustrates an example of the activation stage of the transaction provider enforced one-time authentication code aspect process for embodiments of the invention.

FIG. 4 is a flow chart that illustrates an example of the activation stage of the transaction provider enforced one-time authentication code aspect process for embodiments of the invention. Referring to FIG. 4, at S16, the customer at the computing device 10 with the browser logs on the financial institution's home banking portal server 14, enters a selection for the sensitive transaction task, is redirected to the transaction server 22, and enters the one-time code when prompted by the transaction server 22. At S17, the transaction server determines whether or not the one-time code is valid, and if valid, activates the transaction and sends a response confirming activation of the transaction to the customer.

Figure 5:
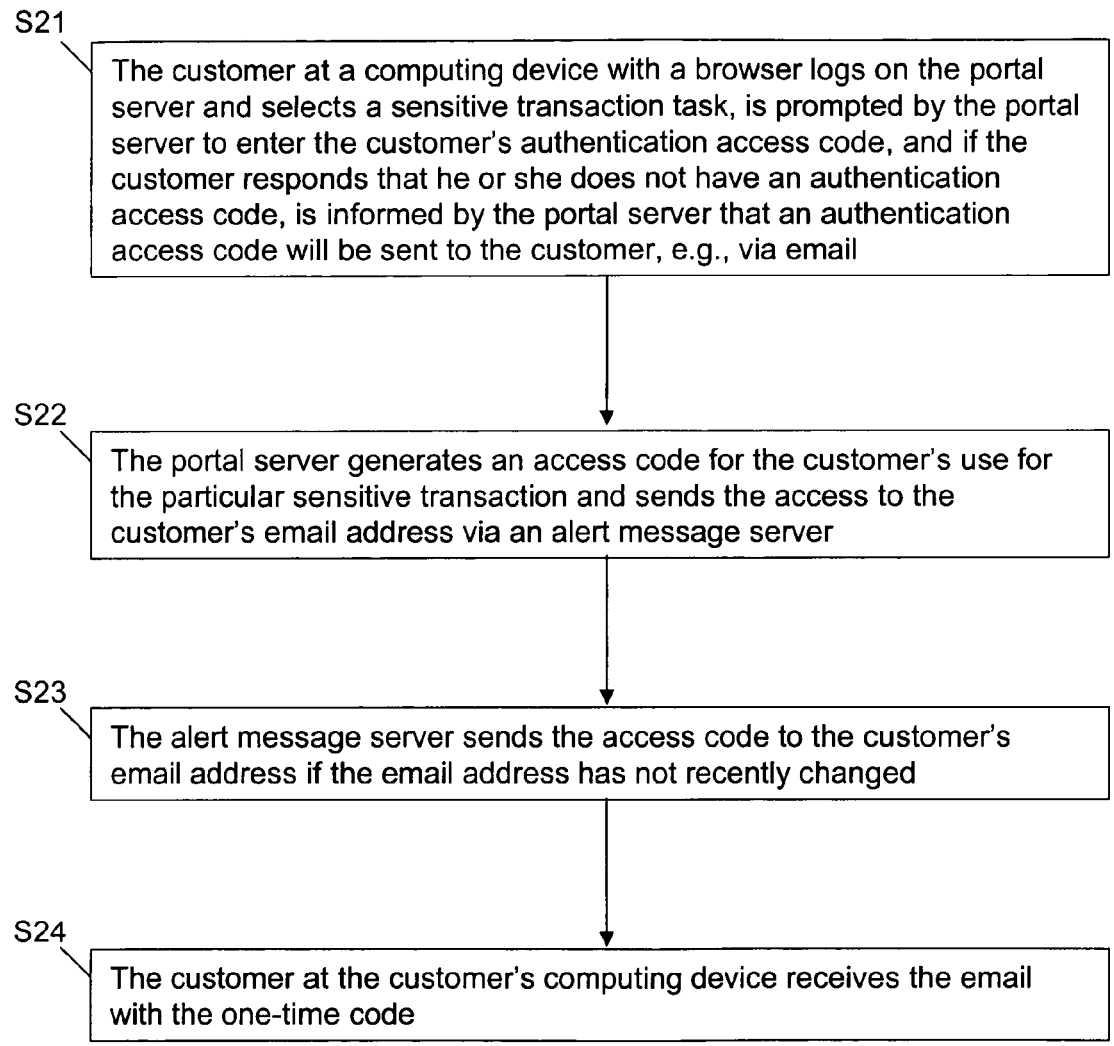
FIG. 5 is a flow chart that illustrates an example of the request access code stage of a navigation provider-enforced authentication code aspect process for embodiments of the invention.

FIG. 5 is a flow chart that illustrates an example of the request access code stage of the navigation provider enforced authentication code aspect for embodiments of the invention. In the navigation provider enforced process, the navigation provider provides enforcement on a navigation task basis in which, for example, a customer is not allowed to enter a navigation task without an authentication access code. It is to be understood that the authentication access code can be any one of a one-time use code, or a multi-use code with an expiration time or date, or use-count code. Referring to FIG. 5, at S21, the customer at the computing device 10 with a browser logs on the financial institution's home banking portal server 14 and selects a sensitive transaction task, such as a wire transfer, is prompted by the portal server 14 to enter the customer's authentication access code (i.e., secure access code), and if the customer responds that her or she does not have an authentication access code, is informed by the portal server 14 that an authentication access code will be emailed to the customer. At S22, the portal server 14 generates an access code for the customer's use for the particular sensitive transaction and sends the access to the customer's email address via a financial institution alert message server 16. At S23, the alert message server 16 sends the access code to the customer's email address if the email address has not recently changed. At S24, the customer at the customer's computing device 10 receives the email with the one-time code.

Figure 6:
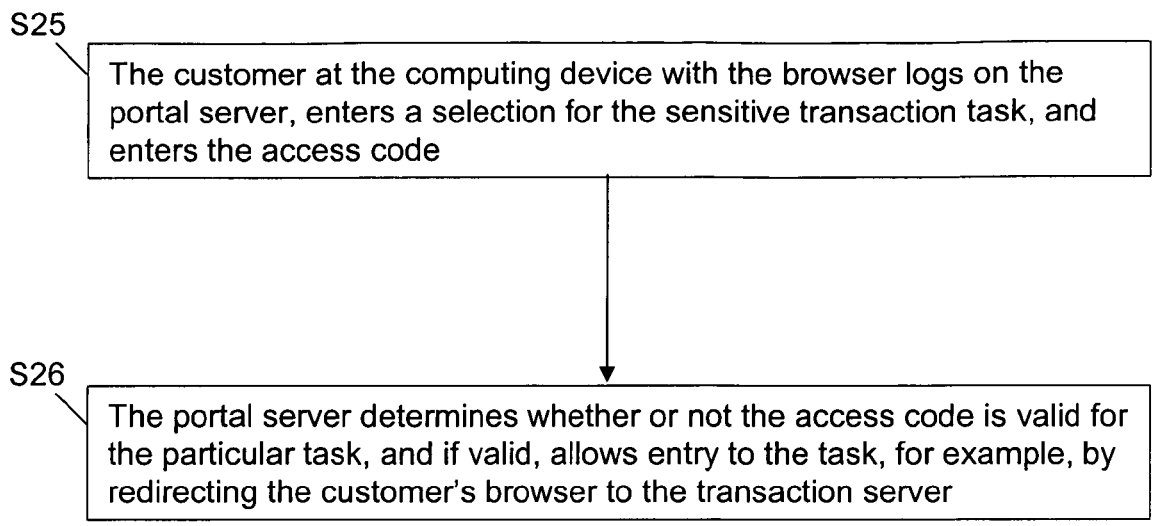
FIG. 6 is a flow chart that illustrates an example of the access allowed stage of the navigation provider enforced authentication code aspect process for embodiments of the invention.

FIG. 6 is a flow chart that illustrates an example of the access allowed stage of the navigation provider-enforced authentication code aspect process for embodiments of the invention. Referring to FIG. 6, at S25, the customer at the computing device 10 with the browser logs on the financial institution's home banking portal server 14, enters a selection for the sensitive transaction task, and enters the access code. At S26, the portal server 14 determines whether or not the access code is valid for the particular task, and if valid, allows entry to the task, for example, by redirecting the customer's browser to the transaction server 22. It is noted that in the navigation provider enforced process, the transaction provider or providers are transparent to the authentication process. It is to be further noted that the customer can perform more that one sensitive transaction during a session and there is no need to pend transactions.

Figure 7:
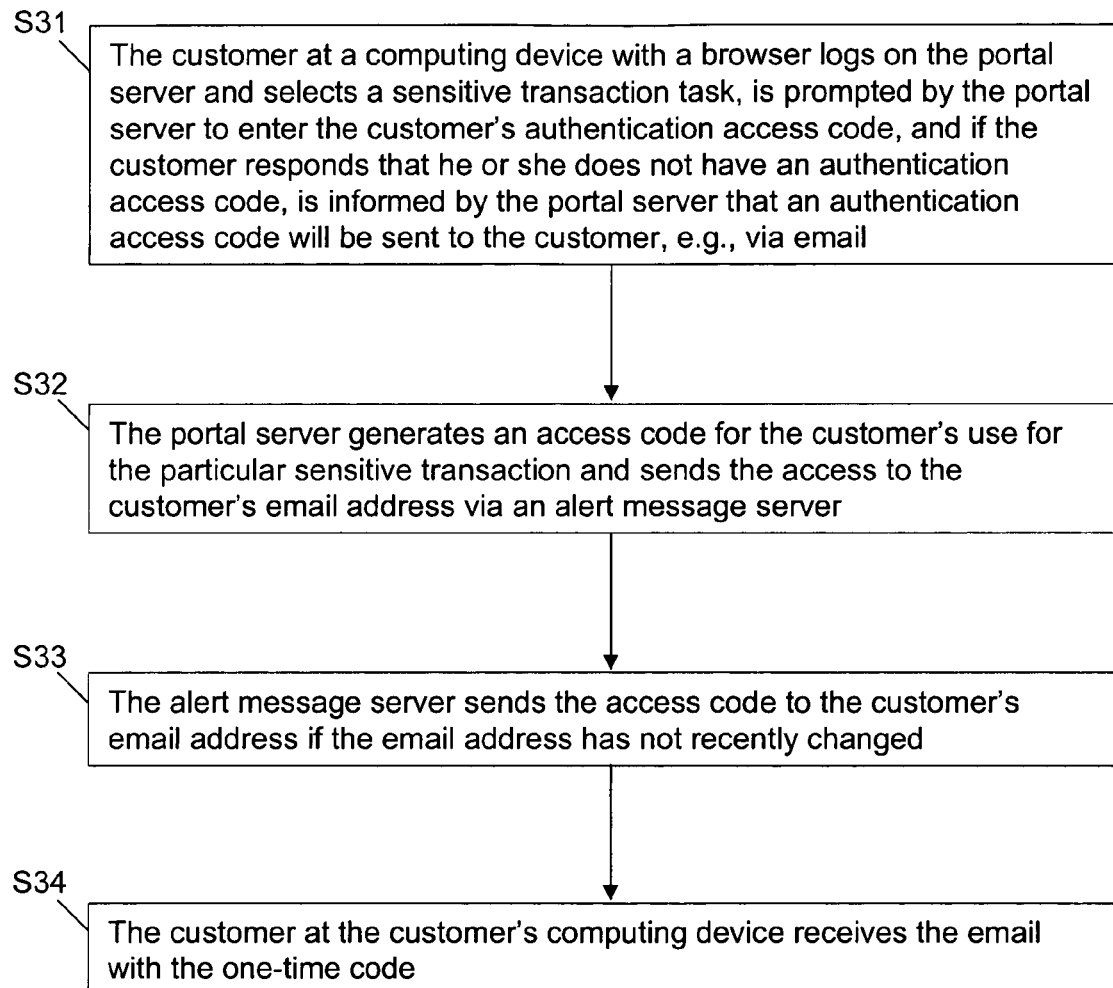
FIG. 7 is a flow chart that illustrates an example of the request access code stage of a hybrid navigation provider-enforced/transaction provider-enforced-plus-aware menus authentication code aspect process for embodiments of the invention.

FIG. 7 is a flow chart that illustrates an example of the request access code stage of the hybrid navigation provider-enforced/transaction provider-enforced-plus-aware menus authentication code aspect process for embodiments of the invention. In the hybrid process, the navigation provider likewise provides enforcement on a navigation task basis in which, for example, a customer is not allowed to enter a navigation task without an authentication access code (i.e., secure access code). It is likewise to be understood that the authentication access code can be any one of a one-time use code, or a multi-use code with an expiration time or date, or use-count code. Referring to FIG. 7, at S31, the customer at a computing device 10 with a browser logs on the financial institution's home banking portal server 14 and selects a sensitive transaction task, such as a wire transfer, is prompted by the portal server 14 to enter the customer's authentication access code, and if the customer responds that her or she does not have an authentication access code, is informed by the portal server 14 that an authentication access code will be emailed to the customer. At S32, the portal server 14 generates an access code for the customer's use for the particular sensitive transaction and sends the access code to the customer's email address via a financial institution alert message server 16. At S33, the alert message server 16 sends the access code to the customer's email address if the email address has not recently changed. At S34, the customer at the customer's computing device 10 receives the email with the one-time code.

Figure 8:
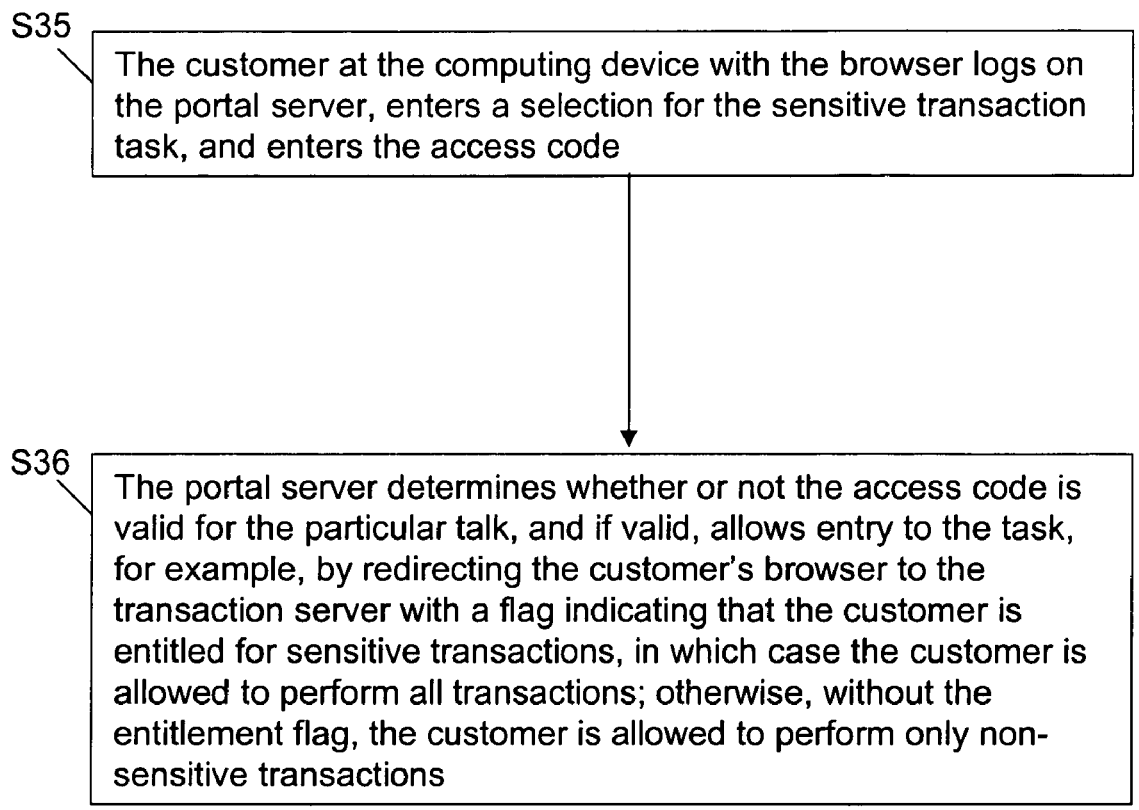
FIG. 8 is a flow chart that illustrates an example of the access allowed stage of the hybrid process for embodiments of the invention.

FIG. 8 is a flow chart that illustrates an example of the access allowed stage of the hybrid process for embodiments of the invention. Referring to FIG. 8, at S35, the customer at the computing device 10 with the browser logs on the financial institution's home banking portal server 14, enters a selection for the sensitive transaction task, and enters the access code. At S36, the portal server 14 determines whether or not the access code is valid for the particular talk, and if valid, allows entry to the task, for example, by redirecting the customer's browser to the transaction server 22 with a flag indicating that the customer is entitled for sensitive transactions, in which case the customer is allowed to perform all transactions. Otherwise, without the entitlement flag, the customer is allowed to perform only non-sensitive transactions. It is noted that in the hybrid process, the transaction provider or providers are transparent to the authentication process. It is to be further noted that the customer can perform more that one sensitive transaction during a session and there is no need to pend transactions.

The secure transaction code for embodiments of the invention provides an additional level of protection for highly sensitive transactions, such as wire transfers or other high-risk transactions, by requiring a customer to use a transaction authorization code (i.e., secure access code) to make each such transaction. Thus, when a customer selects a link to a sensitive transaction, an authorization page is displayed to the customer explaining the need for an authorization code to access the function. The page also presents options for the customer to enter a code, to request a code, or to access a non-sensitive function. Customers who already possess a code can exercise the first option and enter a code in an entry field. Customers who do not already possess a code can exercise the second option to request a code and be sent a randomly generated code via e-mail using the customer's email address in the user profile. The signed-on customer in the same or a later session then provides the transaction code to authorize the requested sensitive function or possibly to authorize some other sensitive function. The transaction code expires a pre-determined time after issuance, such as one week.

In embodiments of the invention, whenever a customer changes the customer's profile e-mail address, a flag is set on the stored profile prohibiting the sending of a transaction code to the customer at the customer's email address. The flag can also be set to expire after a pre-determined period, such as one week. During that period of time, if the customer requests that he or she be sent a transaction code via e-mail, an error page is presented advising the customer that a transaction code cannot be sent, and that if the customer needs to perform a sensitive transaction, such as a wire transfer in the meantime, the transaction can be performed in person at a financial institution office. Alternatively, the error page can direct the customer to call a number for customer service, for example, for manual authentication by a customer service representative. Upon manually authenticating the customer, the customer service representative can provide a random transaction code for the customer or clear the e-mail flag, whereupon the customer can request the code online and receive it at the customer's new e-mail address. Customers who exercise the third option to access non-sensitive functions are provided information only. For example, in the case of wire transfers, the customer is presented a menu with options to view information about wire transfers that are planned, past, or incoming.

In embodiments of the invention, whenever the e-mail address in the customer's stored user profile is changed, an alert is sent by email to both the new email address and to the changed email address. Further, the customer's current user profile e-mail address is displayed on the customer's signed-on home page, along with a link to edit the address. In addition, whenever an email address change is made, a notification is displayed for the customer that the email address has been changed.

Figure 9:
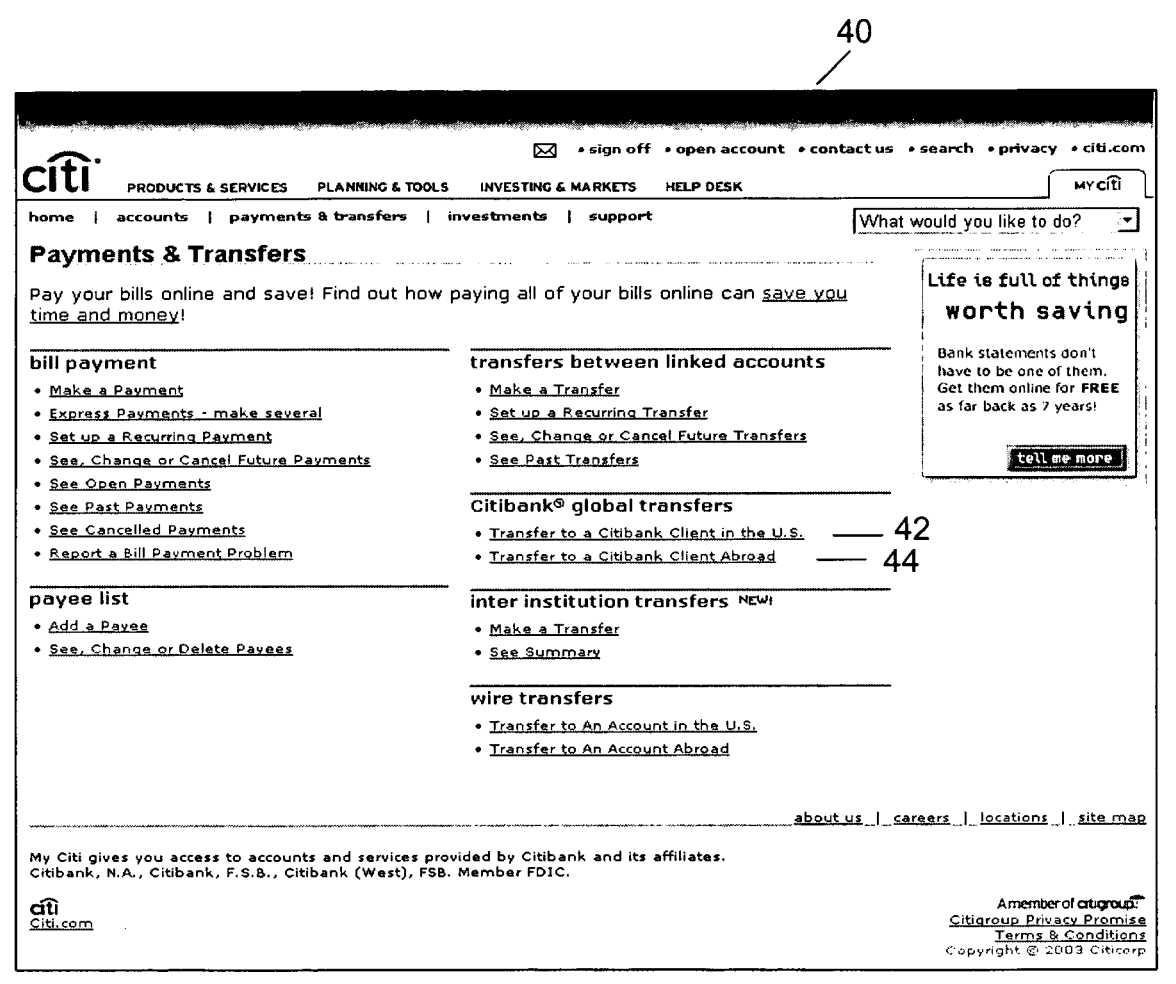

Embodiments of the invention employ various GUI screens. It is to be understood that while the example flow and screens described herein relate to sensitive transactions, such as wire transfers, the same transaction authentication process for embodiments of the invention is equally useful and easily portable to other sensitive transaction types. FIG. 9 is a sample payments and transfers GUI menu screen 40 for the secure transaction code aspect of embodiments of the invention. Referring to FIG. 9, if a customer selects a sensitive function, such as "Transfer to an Account in the U.S." 42 or "Transfer to an Account Abroad" 44, a link brings up a transaction authorization entry screen.

Figure 10:
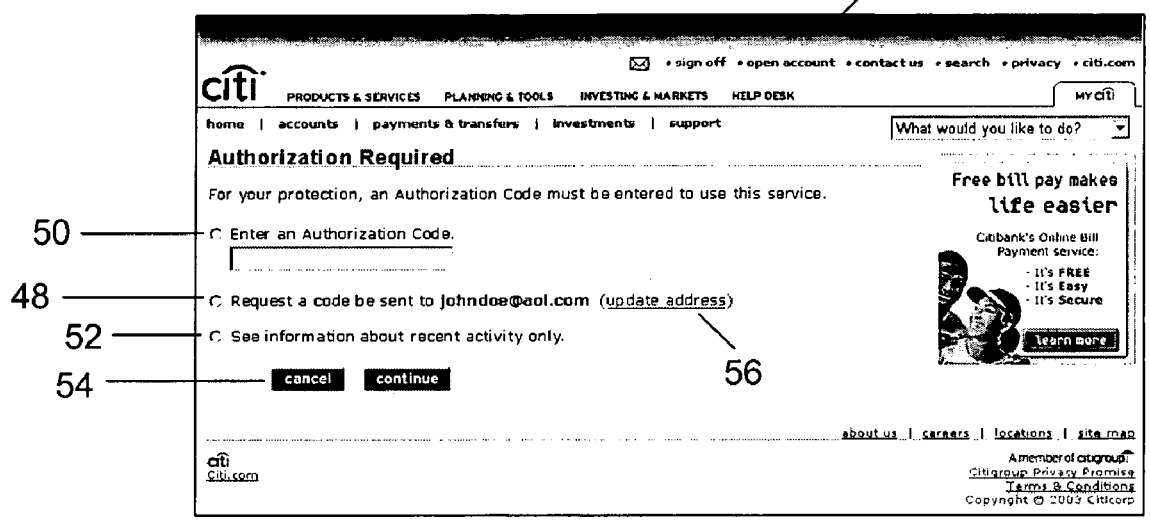
FIG. 10 is a sample transfer authorization code entry GUI screen for the secure transaction code aspect of embodiments of the invention.
Figure 11:
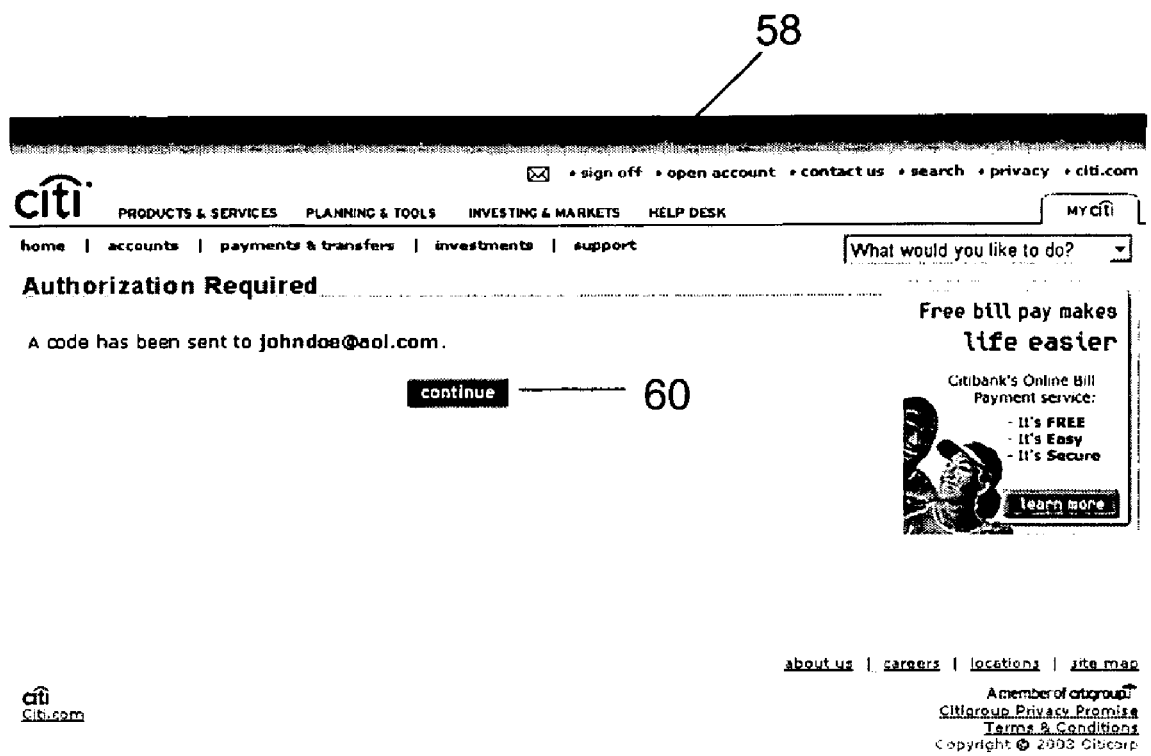
FIG. 11 is a sample transfer authorization code confirmation GUI screen for the secure transaction code aspect of embodiments of the invention.
Figure 12:
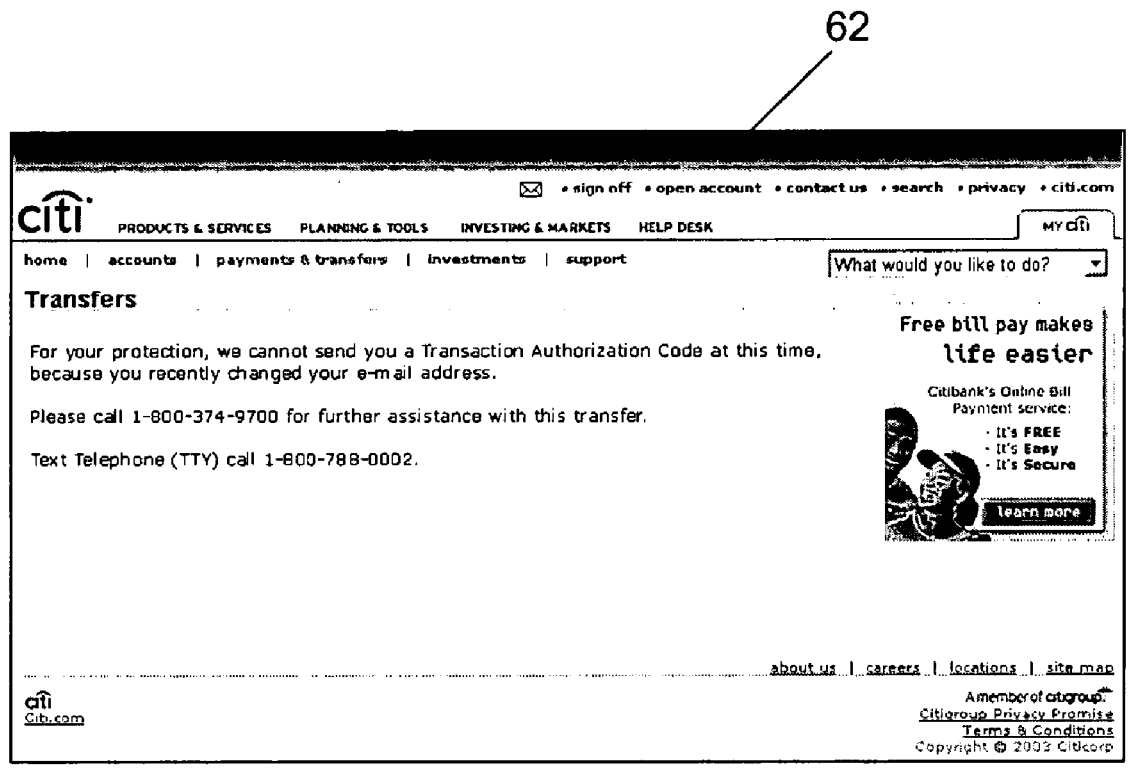
FIG. 12 is a sample email address error GUI page for the secure transaction code aspect of embodiments of the invention.
Figure 13:
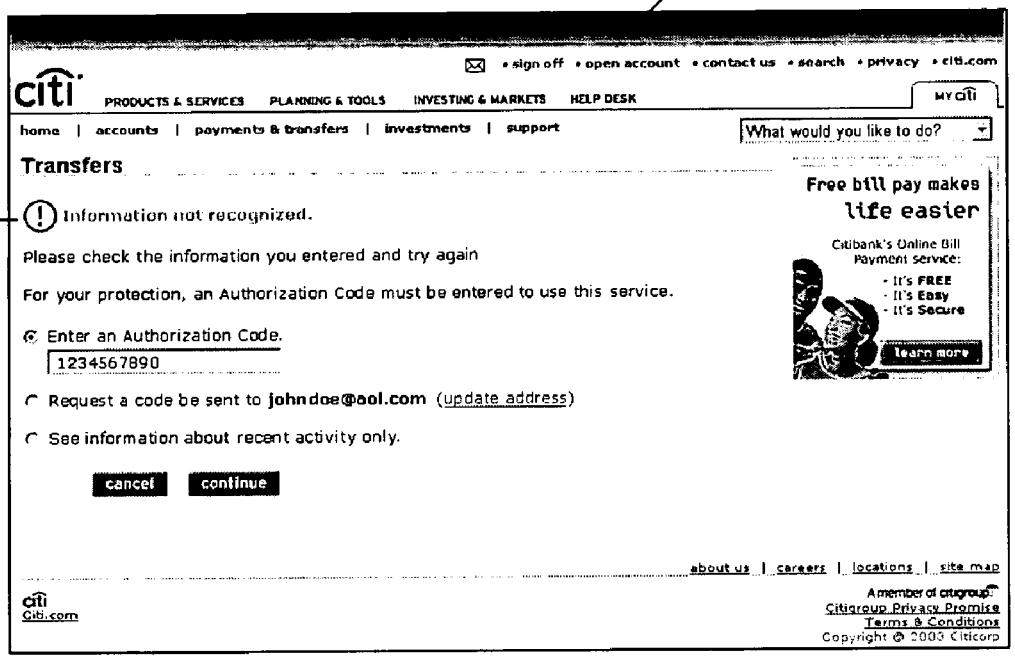
FIG. 13 is a sample authorization code error GUI page for the secure transaction code aspect of embodiments of the invention.

FIG. 10 is a sample transfer authorization code entry GUI screen 46 for the secure transaction code aspect of embodiments of the invention. Referring to FIG. 10, the customer is presented with options of requesting an authorization code 48, entering an authorization code previously provided to the customer 50, or selecting a non-sensitive (informational) function 52. If the customer enters a transaction authorization code and the authorization code is authenticated, an appropriate sensitive transaction menu is presented for the customer. If the authorization code is not authenticated, an authorization code error screen is displayed for the customer. In addition, the customer can select "Cancel" 54 and return to the payments and transfers menu 40. Referring further to FIG. 10, if the customer enters a selection requesting that a code be sent to the customer 48, if no authorization flag is set on the customer's profile email address, a transfer authorization code confirmation GUI screen is displayed for the customer. However, if an authorization flag is set on the customer's profile email address, an error page is displayed informing the customer that the code cannot be sent by email. An update address link 56 allows the customer to update the customer's email address. If the customer enters a selection to see information about recent activity 52, the customer is offered further options to view information about planned wire transfers, past wire transfers, and incoming wire transfers FIG. 11 is a sample transfer authorization code confirmation GUI screen 58 for the secure transaction code aspect of embodiments of the invention. Referring to FIG. 11, the transfer authorization code confirmation GUI page 58 notifies the customer that a code has been sent and advises the customer how to use the transfer authorization code. When the customer clicks on "Continue" 60, the customer is returned to the transfer authorization code entry screen 40. FIG. 12 is a sample email address error GUI page 62 for the secure transaction code aspect of embodiments of the invention. Referring to FIG. 12, when the customer has changed the customer's profile e-mail address within a pre-determined preceding period of time, such as in the past week, the error page 62 is presented to the customer to advise the customer of the situation. FIG. 13 is a sample authorization code error GUI page 64 for the secure transaction code aspect of embodiments of the invention. Referring to FIG. 13, when an authorization code is not authorized by the system, an "Information Not Recognized" error message 66 is presented for the customer on the authorization code error page 64. After a pre-determined number of unsuccessful attempts, such as three such attempts, to match the authorization code, the customer's personal identification number, such as a PIN or CIN, is blocked.

FIG. 14 is a sample authorization code email message 68 for the secure transaction code aspect of embodiments of the invention. When a customer requests an authorization code, an e-mail similar to the sample email message 68 illustrated in FIG. 14 is sent to the email address associated with the customer's user profile. FIG. 15 is a sample change email notification message 70 for the secure transaction code aspect of embodiments of the invention. When a customer changes the customer's user profile email address, an e-mail similar to the sample email message 70 illustrated in FIG. 15 is sent to both the new email address according to the customer's user profile and to the old email address according to the customer's user profile.

Figure 16:
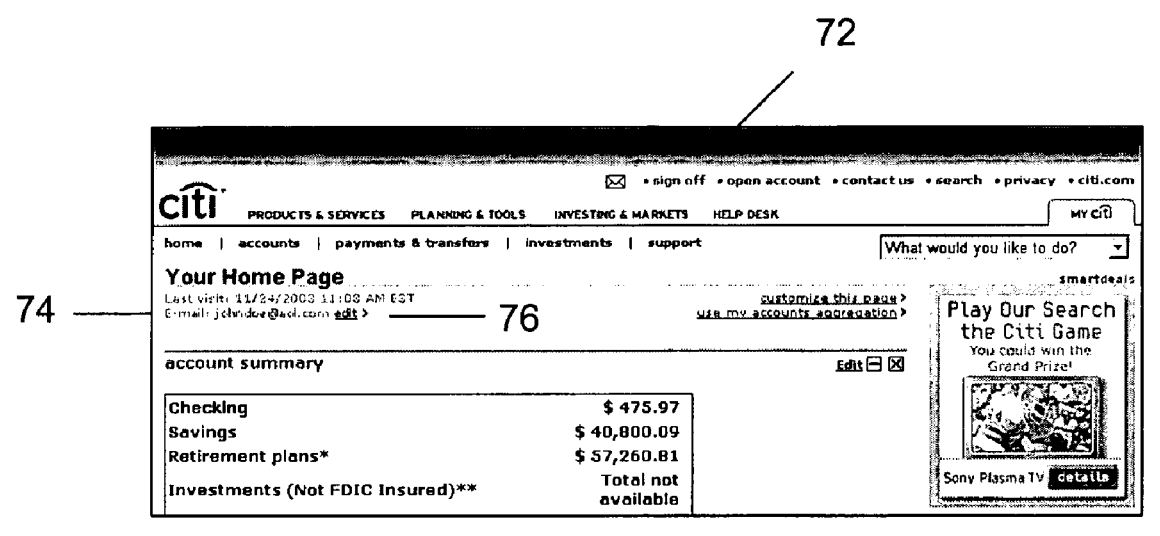
Figure 17:
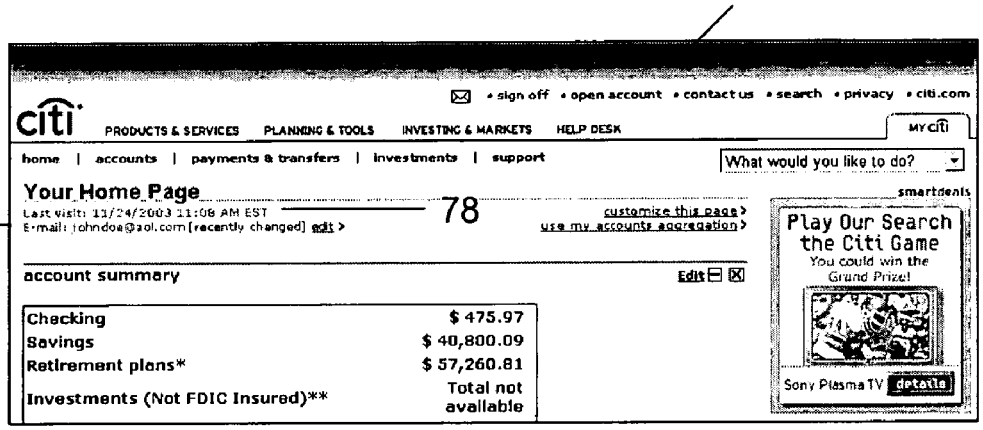
FIG. 17 is a sample home page displaying the customer's current email address with a notification of a recently changed email address for the secure transaction code aspect of embodiments of the invention.

FIG. 16 is a sample home page 72 displaying the customer's current email address 74 for the secure transaction code aspect of embodiments of the invention. Referring to FIG. 16, the customer's home page 72 displays the customer's current e-mail address 74 and also provides a link to an edit function 76 to update the customer's email address on the customer's user profile. In addition, email address changes are highlighted on the home page 72 displaying the customer's email address for a pre-determined period, such as one week. FIG. 17 is a sample home page 72 displaying the customer's current email address with a notification of a recently changed email address 78 for the secure transaction code aspect of embodiments of the invention.

A unique feature of the secure transaction code aspect for embodiments of the invention is that, unlike most one-time password mechanisms, there is no requirement for the customer to have any kind of physical device that generates a unique one-time value. Instead, in the secure transaction code aspect, the bank on the server side generates the value and communicates it to the customer out of band, and upon receipt by the customer, it is only necessary for the customer to enter the value. Thus, the secure transaction code achieves secure aspects of a one-time password without the expense, inconvenience, and complications of using one-time password key fobs or similar types of one-time password generating devices.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method for secure user authentication in electronic commerce, comprising:

maintaining on a transaction server electronic information having a first aspect, to which a user at a computing device is provided access over a first electronic communication channel in response to entry at the computing device of a first credential known to the user and a second aspect, to which the user at the computing device is provided access over the first electronic communication channel in response to entry at the computing device of a second credential provided to the user, said first electronic communication channel consisting at least in part of said computing device coupled over a network to the transaction server via an access server;

pre-registering with a message server a delivery address on a second electronic communication channel that is different from the first electronic communication at which the second credential is provided to the user, said second electronic communication channel consisting at least in part of a telecommunication device coupled over a telecommunication network to the message server;

providing the user successive current sessions of access to the first aspect of the electronic information by the access server in response to entry at the computing device of the first credential;

providing by the message server a new second credential to the user at the pre-registered delivery address via the second electronic communication channel in response to a user log-off at a conclusion of each of said successive current sessions of user access to the first aspect for use during a single immediately succeeding session of user access to the first aspect only after first checking and confirming an absence of a change of delivery address flag set for the user, or if a change of delivery address flag for the user is present, after first confirming an expiration of a pre-determined period of time since the change of address flag was set for the user; and providing the user at the computing device a session of access to the second aspect of the electronic information by the access server via the first electronic communication channel in response to entry at the computing device of the new second credential during the single immediately succeeding session of user access to the first aspect.

2. The method of claim 1, wherein said first aspect further comprises pre-selected non-sensitive transaction aspects of the electronic information and said second aspect further comprises pre-selected sensitive transaction aspects of the electronic information.

3. The method of claim 1, wherein said network over which the computing device is coupled to the transaction server further comprises a global network and said access server further comprises a website server.

4. The method of claim 1, wherein said computing device further comprises a self-service financial transaction terminal, said network over which the computing device is coupled to the transaction server further comprises a self-service financial transaction terminal network, and said access server further comprises a host server.

5. The method of claim 1, wherein said first credential further comprises a password selected by the user for identifying the user.

6. The method of claim 1, wherein said second credential further comprises a randomly generated secret code for identifying the user that is provided to the user.

7. The method of claim 1, wherein said second credential is provided to the user for a single session of access to the second aspect of the electronic information.

8. The method of claim 1, wherein said second credential has a pre-determined expiry, after which the second credential is no longer valid for accessing the second aspect of the electronic information.

9. The method of claim 1, wherein pre-registering said delivery address on the second electronic communication channel further comprises pre-registering a mobile telecommunication device address for providing the user the second credential.

10. The method of claim 1, wherein providing said second credential to the user via the second electronic communication channel further comprises providing the second credential to the user by text message.

11. A computer system for secure user authentication in electronic commerce, comprising:

a transaction server that stores electronic information having a first aspect, to which a user at a computing device is provided access over a first electronic communication channel in response to entry at the computing device of a first credential known to a user and a second aspect, to which the user at the computing device is provided access over the first electronic communication channel in response to entry of a second credential provided to the user, said first electronic communication channel consisting at least in part of said computing device coupled over a network to the transaction server via an access server;

a message server with which a delivery address on a second electronic communication channel that is different from the first electronic communication channel is pre-registered at which the second credential is provided to the user, said second electronic communication channel consisting at least in part of a telecommunication device coupled over a telecommunication network to the message server;

said access server that further provides the user a successive current sessions of access to the first aspect of the electronic information in response to entry at the computing device of the first credential;

said message server that provides a new second credential to the user at the pre-registered delivery address via the second electronic communication channel in response to a user log-off at a conclusion of each of said successive current sessions of user access to the first aspect for use during a single immediately succeeding session of user access to the first aspect only after first checking and confirming an absence of a change of delivery address flag set for the user, or if a change of delivery address flag for the user is present, after first confirming an expiration of a pre-determined period of time since the change of address flag was set for the user; and said access server that additionally provides the user at the computing device a session of access to the second aspect of the electronic information via the first electronic communication channel in response to entry at the computing device of the new second credential during the single immediately succeeding session of user access to the first aspect.

* * * * *